(12) United States Patent
Vilner

(10) Patent No.: US 7,901,503 B2
(45) Date of Patent: Mar. 8, 2011

(54) PIGMENTS FOR NON-AQUEOUS INKS AND COATINGS

(75) Inventor: Stanislav Vilner, Mason, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 12/597,045

(22) PCT Filed: Apr. 3, 2008

(86) PCT No.: PCT/US2008/059215
§ 371 (c)(1),
(2), (4) Date: Oct. 22, 2009

(87) PCT Pub. No.: WO2008/134190
PCT Pub. Date: Nov. 6, 2008

(65) Prior Publication Data
US 2010/0126378 A1 May 27, 2010

Related U.S. Application Data

(60) Provisional application No. 60/913,686, filed on Apr. 24, 2007.

(51) Int. Cl.
C09B 67/20 (2006.01)
C09B 67/18 (2006.01)
C09B 67/00 (2006.01)
C09B 67/22 (2006.01)
C09D 11/00 (2006.01)

(52) U.S. Cl. .............. 106/493; 106/31.6; 106/31.77; 106/31.78; 106/31.79; 106/31.8; 106/31.81; 106/31.9; 106/410; 106/413; 106/476; 106/494; 106/495; 106/496; 106/497; 106/498; 106/499

(58) Field of Classification Search ............. 106/31.6, 106/31.77, 31.78, 31.79, 31.8, 31.81, 31.9, 106/410, 413, 476, 493, 494, 495, 496, 497, 106/498, 499
See application file for complete search history.

(56) References Cited

U.S. PATENT DOCUMENTS

| | | | |
|---|---|---|---|
| 2,439,442 A | 4/1948 | Amon et al. | |
| 3,006,921 A | 10/1961 | Weinmayr | |
| 3,023,118 A | 2/1962 | Donnet | |
| 3,043,708 A | 7/1962 | Watson et al. | |
| 3,347,632 A | 10/1967 | Parker | |
| 3,386,843 A | 6/1968 | Jaffe et al. | |
| 3,635,981 A | 1/1972 | Weinberger | |
| 3,754,958 A | 8/1973 | Giambalvo | |
| 3,996,059 A | 12/1976 | Stansfield et al. | |
| 4,039,346 A | 8/1977 | Kranz | |
| 4,057,436 A | 11/1977 | Davies et al. | |
| 4,104,275 A | 8/1978 | Kauer | |
| 4,104,276 A | 8/1978 | Kranz et al. | |
| 4,141,904 A | 2/1979 | Cabut et al. | |
| 4,197,404 A | 4/1980 | Johnson | |
| 4,256,507 A | 3/1981 | Kranz et al. | |
| 4,310,359 A | 1/1982 | Ehashi et al. | |
| 4,350,632 A | 9/1982 | Springer | |
| 4,439,240 A | 3/1984 | Ganci | |
| 4,455,173 A | 6/1984 | Jaffe | |
| 4,468,255 A | 8/1984 | Schwartz et al. | |
| 4,478,968 A | 10/1984 | Jaffe | |
| 4,541,872 A | 9/1985 | Jaffe | |
| 4,643,255 A | 2/1987 | Sandiford et al. | |
| 4,726,847 A | 2/1988 | Wanser | |
| 4,844,742 A | 7/1989 | Jaffe | |
| 4,888,422 A | 12/1989 | Takei et al. | |
| 4,895,949 A | 1/1990 | Jaffe et al. | |
| 4,920,217 A | 4/1990 | Lambie et al. | |
| 4,946,508 A | 8/1990 | Schwartz et al. | |
| 4,952,688 A | 8/1990 | Springer | |
| 4,981,888 A | 1/1991 | Langley et al. | |
| 5,021,090 A | 6/1991 | Schwartz et al. | |
| 5,194,088 A | 3/1993 | Babler et al. | |
| 5,250,111 A | 10/1993 | Langley et al. | |
| 5,264,032 A | 11/1993 | Dietz et al. | |
| 5,264,034 A | 11/1993 | Dietz et al. | |
| 5,264,733 A | 11/1993 | Tigges | |
| 5,271,759 A | 12/1993 | Wooden et al. | |
| 5,275,653 A | 1/1994 | Dietz et al. | |
| 5,286,863 A | 2/1994 | Babler et al. | |
| 5,296,033 A | 3/1994 | Dietz et al. | |
| 5,296,034 A | 3/1994 | Dietz et al. | |
| 5,334,727 A | 8/1994 | Campbell | |
| 5,424,429 A | 6/1995 | Hendi et al. | |
| 5,427,616 A | 6/1995 | Tsuji et al. | |
| 5,453,151 A | 9/1995 | Babler | |
| 5,457,203 A | 10/1995 | Hendi et al. | |

(Continued)

FOREIGN PATENT DOCUMENTS

DE 102 56 416 6/2004

(Continued)

OTHER PUBLICATIONS

Nemoto, Y. et al., "The Interaction between Dyes and Nonionic Surfactants," Ind. Eng. Chem. Prod. Res. Dev., vol. 19 (1980) pp. 136-142.
International Search Report dated Mar. 5, 2009 for Application No. PCT/US2008/059215.
Surfonamine® B-100 Amine, Huntsman (2006) pp. 1-2.
The Use of Surfonamine® Amines in Ink and Pigment Applications, Huntsman (2006) pp. 1-5.

*Primary Examiner* — Anthony J Green
(74) *Attorney, Agent, or Firm* — McKenna Long & Aldridge LLP

(57) ABSTRACT

A sulfonated derivative of an organic pigment moiety comprising a polyetheramine, and a metal or ammonium salt. The pigment is used for coloration of printing inks and coatings. For ink-jet systems there is excellent filterability, low viscosity, and stability thereof.

22 Claims, No Drawings

U.S. PATENT DOCUMENTS

| | | | |
|---|---|---|---|
| 5,466,807 | A | 11/1995 | Dietz et al. |
| 5,472,494 | A | 12/1995 | Hetzenegger et al. |
| 5,476,544 | A | 12/1995 | Endo et al. |
| 5,516,899 | A | 5/1996 | Campbell et al. |
| 5,554,739 | A | 9/1996 | Belmont |
| 5,711,800 | A | 1/1998 | Badejo et al. |
| 5,718,754 | A | 2/1998 | Macpherson et al. |
| 5,755,873 | A | 5/1998 | Badejo et al. |
| 5,779,783 | A | 7/1998 | Senba et al. |
| 5,821,334 | A | 10/1998 | Powers |
| 5,827,774 | A | 10/1998 | Kitajima |
| 5,827,775 | A | 10/1998 | Miles et al. |
| 5,837,045 | A | 11/1998 | Johnson et al. |
| 5,928,419 | A | 7/1999 | Uemura et al. |
| 5,935,272 | A | 8/1999 | Mahaffey, Jr. et al. |
| 5,958,129 | A | 9/1999 | Urban et al. |
| 5,989,333 | A | 11/1999 | Urban et al. |
| 5,998,621 | A | 12/1999 | Mahaffey, Jr. |
| 6,066,203 | A | 5/2000 | Badejo et al. |
| 6,083,315 | A | 7/2000 | Nakamura et al. |
| 6,123,761 | A | 9/2000 | Healy |
| 6,123,763 | A | 9/2000 | Kamikubo et al. |
| 6,152,968 | A | 11/2000 | Etzbach et al. |
| 6,221,932 | B1 | 4/2001 | Moffatt et al. |
| 6,225,472 | B1 | 5/2001 | Babler |
| 6,228,942 | B1 | 5/2001 | Michot et al. |
| 6,251,553 | B1 | 6/2001 | Baur et al. |
| 6,264,733 | B1 | 7/2001 | Babler |
| 6,284,031 | B1 | 9/2001 | Healy |
| 6,284,890 | B1 | 9/2001 | Mitina |
| 6,406,533 | B2 | 6/2002 | Babler |
| 6,454,845 | B1 | 9/2002 | Shawcross et al. |
| 6,471,764 | B1 | 10/2002 | Robertson et al. |
| 6,494,948 | B2 | 12/2002 | Rice et al. |
| 6,506,245 | B1 | 1/2003 | Kinney et al. |
| 6,554,891 | B1 | 4/2003 | Momose et al. |
| 6,641,653 | B2 | 11/2003 | Yu |
| 6,641,655 | B1 | 11/2003 | McElhinney et al. |
| 6,648,954 | B2 | 11/2003 | Uemura et al. |
| 6,689,525 | B2 | 2/2004 | Itabashi |
| 6,692,562 | B2 | 2/2004 | Schulz |
| 6,723,783 | B2 | 4/2004 | Palumbo et al. |
| 6,726,755 | B2 | 4/2004 | Titterington et al. |
| 6,726,762 | B2 | 4/2004 | Okamoto et al. |
| 6,780,389 | B2 | 8/2004 | Karl et al. |
| 6,793,727 | B2 | 9/2004 | Mochizuki et al. |
| 6,821,334 | B2 | 11/2004 | Nakamura et al. |
| 6,827,774 | B2 | 12/2004 | Bugnon |
| 6,833,026 | B2 | 12/2004 | Palumbo |
| 6,852,156 | B2 | 2/2005 | Yeh et al. |
| 6,852,158 | B2 | 2/2005 | Belmont et al. |
| 6,896,726 | B2 | 5/2005 | Bugnon et al. |
| 6,918,958 | B2 | 7/2005 | Weber et al. |
| 6,926,768 | B2 | 8/2005 | Arthur et al. |
| 7,045,637 | B2 | 5/2006 | Weber et al. |
| 7,045,638 | B2 | 5/2006 | Weber et al. |
| 7,074,267 | B2 | 7/2006 | Coughlin et al. |
| 7,077,898 | B2 | 7/2006 | Babler |
| 7,141,104 | B2 | 11/2006 | De Voeght et al. |
| 7,156,912 | B2 | 1/2007 | Sato et al. |
| 2005/0022695 | A1 | 2/2005 | Yokoyama et al. |
| 2006/0112853 | A1 | 6/2006 | Ham |

FOREIGN PATENT DOCUMENTS

| | | |
|---|---|---|
| EP | 1 362 895 | 11/2003 |
| WO | WO 02/40596 | 5/2002 |

PIGMENTS FOR NON-AQUEOUS INKS AND COATINGS

CROSS REFERENCE TO RELATED APPLICATIONS

This application is a 371 of International Patent Application PCT/US2008/059215, filed Apr. 3, 2008, which claims the benefit of U.S. Provisional Application Ser. No. 60/913,686, filed Apr. 24, 2007.

BACKGROUND

Pigmentation of non-aqueous inks and coatings is facilitated by various forms of milling the pigment into the carrier vehicle. Some pigments are very difficult to disperse and stabilize into these systems. Modification of the pigment surface to promote the formation of effective adsorption layers of polymeric molecules (resins, dispersants, and surfactants) has to be found to be a solution for producing stable pigment dispersions with satisfactory properties at a reasonable cost. It is not unusual for organic pigments, especially polycyclic pigments, to have a surface with low polarity (lack of functional groups, strong electric charges, active centers, and the like) (R. Sappok, J. Oil Col. Chem. Assoc., 61 (1978), 299-308). In many cases, the low polarity may be explained by the morphology of the primary pigment crystals, and intra- and inter-molecular hydrogen bonding (W. Herbst, K. Hunger, "Industrial Organic Pigments", VCH, 1997). As a result, the adsorption energy for a wide array of polymers and surfactants is low, and may be characterized as a physical adsorption. This type of adsorption is reversible, and it may not provide an efficient barrier to flocculation, due to the desorption process.

One of the oldest and popular methods for surface modification is the use of synergists, which are derivatives of organic pigments with a strong affinity for the pigment surface. One of the earliest original studies was carried out with phthalocyanine pigments (W. Black, F. T. Hesselink, A. Topham, Kolloid-Zeitschrift and Zeitschrift für Polymere, Bd.213, Heft 1-2, (1966), 150-156). As soon as the mechanism of stabilization of the dispersions was understood, the approach was extended successfully for other classes of organic pigments (J. Schroeder, Progress in Organic Coatings, 16 (1988), 3-17; and U.S. Pat. Nos. 3,996,059; and 4,057,436).

The synergists could be soluble or insoluble in application media. The soluble compounds are similar to dyes. Less soluble synergists behave more like pigments. The mechanism of surface modification with soluble or partially soluble compounds can be described in terms of adsorption from the liquid phase. The adsorption energy, the thickness, and the structure of the adsorption layers may be determined from the isotherm of adsorption and other experimental data. The mechanism of surface modification with insoluble synergists is not quite clear. It is believed that the synergists make up solid solutions with pigment crystals, or at least partially penetrate and modify their crystal lattice. The insoluble synergists often demonstrate the ability to stabilize pigment particles against re-crystallization in solvent based dispersions and plastics, especially at elevated temperatures (U.S. Pat. Nos. 4,141,904; 4,981,888; 5,264,032). They are also known to be able to direct and control the growth, crystal phase, and morphology of pigment particles (U.S. Pat. Nos. 6,225,472; 6,264,733).

In general, a synergist consists of a moiety of the pigment, one or more functional groups, connecting groups, and other substituting groups. A wide variety of synergists representing various classes of chromophores and functional groups, are described in relevant literature. Examples of chromophores are: phthalocyanines, quinacridones, quinacridonequinones, anthraquinones, perylenes, azo, azomethines, benzimidazolones, perinones, diketopyrrolopyrroles, isoindolines, isoindolinones, iminoisoindolines, iminoisoindolinones, flavanthrones, dioxazines, indanthrones, anthrapyrimidines, quinophthalones, indigo, thioindigo, isoviolanthrones, and pyranthrones. Functional and connecting groups are represented by sulfonic acids (U.S. Pat. Nos. 4,726,847; 5,296,033; 5,296,034; 6,083,315); metal salts of sulfonic acids (U.S. Pat. Nos. 3,386,843; 5,264,034; 5,275,653; 5,989,333; 6,251,553; 6,793,727); salts of sulfonic acid with primary (U.S. Pat. Nos. 6,471,764; 6,926,768), secondary (U.S. Pat. No. 6,152,968), tertiary (U.S. Pat. No. 5,472,494), and quaternary (U.S. Pat. Nos. 3,754,958; 4,057,436; 5,271,759; 6,641,655; 6,648,954) amines; sulfonamides (U.S. Pat. Nos. 4,310,359; 5,427,616; 6,066,203; 6,123,763; 6,454,845; 6,827,775; 7,045,637; 7,045,638), and their mixtures with sulfonic acids (U.S. Pat. Nos. 4,350,632; 4,952,688; 5,779,783); substituted benzamidomethyl and structurally related phthalimidomethyl and sulfobenzimidomethyl derivatives (U.S. Pat. Nos. 3,635,981; 4,197,404; 4,256,507; 4,439,240; 4,455,173; 4,478,968; 4,541,872; 4,844,742; 4,895,949; 5,194,088; 5,264,032; 5,286,863; 5,424,429; 5,453,151; 5,457,203); pyrazolylaminomethyl (U.S. Pat. No. 5,334,727); melaminomethyl (U.S. Pat. No. 6,225,472); barbituratomethyl (U.S. Pat. No. 6,225,472); arylmethyl (U.S. Pat. No. 6,264,733); alkyl amines (U.S. Pat. No. 5,718,754); carboxylic acids (U.S. Pat. No. 6,689,525); salts (U.S. Pat. Nos. 5,296,033; 5,296,034; 5,989,333; 6,918,958), amides (U.S. Pat. Nos. 4,104,275; 4,310,359; 6,123,761; 6,284,031; 6,689,525), and esters (U.S. Pat. No. 6,689,525) of carboxylic acids; carbonyl (U.S. Pat. No. 6,689,525); amidomethyl (U.S. Pat. Nos. 5,250,111; 5,476,544; 5,711,800; 6,123,763); alkylaminomethyl (U.S. Pat. Nos. 4,039,346; 4,104,276; 4,920,217; 5,427,616; 6,225,472); arylalkyloxy (U.S. Pat. Nos. 5,935,272; 5,998,621; 6,726,755); phenylthio and phenylamino (U.S. Pat. No. 5,516,899); and azomethine (U.S. Pat. No. 4,946,508). Numerous combinations of aforementioned groups are utilized as synergists as well (U.S. Pat. Nos. 4,888,422; 5,466,807; 5,472,494; 5,516,899; 5,958,129; 6,406,533; 6,918,958; 7,156,912). The applications of various classes of dyes as synergists are also known in the art (U.S. Pat. Nos. 6,264,733; 6,406,533; 7,074,267; U.S. Pat. App. 2005/0022695).

The synergists are used in all traditional applications such inks, coatings, plastics as well as in other areas like electrophotographic toners and developers, optical filters, ink jet systems, and others.

Another known method of surface modification consists of introducing functional groups during the course of synthesis of pigments by the partial replacement of intermediates with analogous intermediates carrying active groups. This technique of chemical modification is well-known for azo (U.S. Pat. Nos. 4,643,255; 5,021,090), phthalocyanine (U.S. Pat. No. 3,006,921), quinacridone (U.S. Pat. Nos. 5,755,873; 6,284,890; 6,494,948), and perylene (U.S. Pat. No. 6,692,562) pigments.

Finally, direct reaction on the surface of a pigment has been widely practiced as a way to modify surface properties. One of the earliest techniques was a treatment of azo pigments with primary amines, resulting in the formation of azomethine groups (Schiff's bases) (U.S. Pat. No. 4,468,255). Other reactions have been described as well: oxidation with sodium hypochlorite (U.S. Pat. Nos. 2,439,442; 3,347,632; 6,554,891), nitric acid (U.S. Pat. No. 3,023,118), and ozone (U.S.

Pat. No. 6,852,156); sulfonation with sulfur trioxide (U.S. Pat. No. 6,821,334), or sulfur trioxide/pyridine complex (U.S. Pat. No. 5,928,419); Friedel-Crafts alkylation (U.S. Pat. No. 3,043,708), and acylation (U.S. Pat. App. 2006/0112853); amidation (U.S. Pat. No. 6,228,942); decomposition of diazonium salts (Gomberg-Bachmann reaction) (U.S. Pat. Nos. 5,554,739; 5,837,045; 6,221,932; 6,506,245 6,723,783; 6,780,389; 6,896,726); nucleophilic replacement of halogen (U.S. Pat. No. 6,641,653); and radical reaction of alkylarylhalides in the presence of transition metal salts (U.S. Pat. No. 6,852,158). The direct reactions on the pigment surface have been especially fruitful for carbon black pigments, due to their highly developed and reactive surface (U.S. Pat. Nos. 6,780,389; 6,852,156). Examples of other treated substrates include phthalocyanine (U.S. Pat. Nos. 6,641,653; 6,852,156), quinacridones (U.S. Pat. No. 6,852,156), azo (U.S. Pat. No. 6,833,026) and other organic pigments (U.S. Pat. Nos. 5,837,045; 6,821,334).

All three groups of surface modification methods have their advantages and disadvantages. For example, direct sulfonation or oxidation allows the introduction of active groups on the surface of a wide variety of pigments. However, the process requires the use of large amounts of solvents and toxic reagents, like sulfur oxides or ozone, making the process expensive and not environmentally friendly. Alternately, the method of diazonium salt decomposition is relatively simple, low-cost, and environmentally friendly. However, it has a serious limitation of not being efficient for all classes of organic pigments. With respect to chemically modified pigments, the functional groups do not always survive the harsh reaction conditions of pigment synthesis. This approach does not always provide the flexibility for design and production of various grades of pigments for different applications.

Thus, synergists play an important role for pigment surface modification. They can be prepared by simple and economical synthesis procedures, and offer the pigment manufacturer flexible means for producing high performance pigments and dispersions with improved coloristical, rheological, and stability properties.

In applications where dyes have been employed as coloring agents, organic pigments have been finding increasing utility in recent years for their excellent light fastness and resistance to solvents and bleed. These applications include, for example, inks for writing instruments, in which water or oil-soluble dyes have been used as coloring agents; and colorants for plastics, in which oil-soluble dyes have been used as highly transparent colorants. There are also increasing demand for organic pigments as coloring agents for LCD color filters, toners, and ink-jet inks (U.S. Pat. No. 6,726,762).

In ink-jet printing systems, a liquid ink is ejected from a nozzle towards a recording substrate using pressure, heat, or an electric field as the driving force. Ink-jet printing is excellent for printing variable information and can be used to print high-quality photographic images. In general, the ink vehicle can be aqueous or non-aqueous, and ink is referred to as aqueous or non-aqueous ink, accordingly. A more detailed classification of ink-jet systems takes in account the setting mechanism of ink (U.S. Pat. No. 7,141,104): absorption, penetration, and evaporation for water based inks; absorption and penetration for oil based inks; evaporation for solvent based inks; solidification at room temperature for hot melt inks that are liquid at ejection temperature; and polymerization for UV-curable inks.

The demand for outdoor use of ink-jet printed materials has been increasing. Applications include outdoor wrap, such as: vinyl advertising wrap covering trucks, billboards, posters, and signage. Therefore, non-aqueous pigmented inks are developed which can be printed directly on polymeric substrates, used outdoors without lamination, and have good weather resistance.

The requirements for ink-jet inks are quite rigorous, especially regarding the particle size distribution, rheological behavior, and colloidal stability. One of the major reasons for such demanding requirements for pigment dispersions is the size of the nozzles of printing heads. The diameter of the nozzle is normally in the range of 30-50 microns, so any type of instability in ink make the printing process troublesome, or totally impossible.

As it can be seen from the previous examples, the sulfonic group, in the form of a free acid, and more often as a salt with various metals or amines, is widely used for pigment surface modification. For example, salts of phthalocyanine sulfonic acid with $Fe^{2+}$ and $Fe^{3+}$ have been used for improving flow ability and stability of inks based on blue and green phthalocyanine pigments (U.S. Pat. No. 6,793,727).

A similar approach for enhancing the rheological properties (U.S. Pat. No. 7,077,898) is by treating carbon black with aluminum salts of sulfonic acids of quinacridone, perylene, indanthrone, dioxazine, and other polycyclic pigments. To improve the dispersibility of the additive itself, a texture-improving agent is incorporated during or after the synthesis, such as fatty acids, amides, amines, esters, alcohols, polyols, polyvinylalcohols, polyvinylpyrrolidones, oils, waxes, and resins.

The calcium salts of sulfoalkyl- and sulfoarylimides of perylene tetracarboxylic acid anhydride have been utilized for the improvement of the properties of perylene pigments such as color strength, dispersibility in high quality coatings and synthetic resins, resistance to flocculation, and rheological behavior (U.S. Pat. No. 5,264,034).

Sulfoarylmethylene derivatives of polycyclic pigments such as quinacridone, phthalocyanine, and diketopyrrolopyrrole are described in (U.S. Pat. No. 6,264,733). They are made by condensation of para-formaldehyde with a relevant pigment and a sulfonated aromatic compound, for example benzene or naphthalene sulfonic acid. The additives, in the form of the sulfonic free acid, metal, or ammonium salts are recommended as agents to control the growth and crystal phase of pigment particles. They are particularly useful when present during the synthesis of the pigment.

In order to improve the rheological, gloss, stability, and color properties of dioxazine pigments, they are treated with sulfo-containing dioxazine derivatives in the form of metal or ammonium salts, as well as mixtures of salts with alkylarylsulfates (U.S. Pat. No. 5,275,653).

Co-precipitation of sulfonic acids of polycyclic pigments with quaternary amines and calcium chloride is described in (U.S. Pat. Nos. 6,827,774 and 6,827,775). The synergist is claimed as a "rheology improver".

Sulfonic acid groups can also be introduced onto the pigment surface through direct reactions with sulfur trioxide (U.S. Pat. No. 6,821,334) or decomposition of diazocompounds (U.S. Pat. No. 5,837,045).

All aforementioned patents offer some solutions for viscosity reduction and stabilization of pigment dispersions. However, they do not satisfy all stringent specifications that are required of pigments for non-aqueous inkjet inks; especially in respect to filterability of inks, storage stability, and high color strength.

Thus, there is a need for improved high performance pigments and their dispersions that provide non-aqueous ink-jet inks with excellent color, rheological, and stability properties.

In particular, quinacridone pigments such as PR122, PR202, PR207, PR209, PV19, pose problems with respect to flocculation, poor rheological behavior, and poor filterability in non-aqueous inks. PR122, which is process magenta for many applications including ink-jet inks, is especially problematic, as is noted in (U.S. Pat. No. 7,077,898). Other colors used for coloration of non-aqueous ink-jet inks also represent a substantial challenge for producers of non-aqueous ink-jet inks. These include phthalocyanine blue, carbon black, and different types of yellows.

BRIEF SUMMARY

The above-noted and other deficiencies may be overcome by a complex represented by Formula (1):

where, Q is an organic pigment moiety; D is $[R^1R^2N(CH_2CH(CH_3)O)_x(CH_2CH_2O)_yR^4]$; E is $[R^1R^2R^3N(CH_2CH(CH_3)O)_x(CH_2CH_2O)_yR^4]^+$; x and y independently range from 0 through 300, provided that for D and E selected independently, the sum of x+y is at least 3; M is selected from the group consisting of Al, Fe, Ca, Mg, Sr, Ba, Mn, Cu, Ni, Cd, Co, Zn, Cr, Ti, Zr, and $NR^1R^2R^3R^4$; $R^1$, $R^2$, and $R^3$ are independently selected from the group consisting of H, alkyl, aryl, alkaryl, poly-(oxyalkylene), provided that for E, if both $R^1$ and $R^2$ are H, then $R^3$ is H; $R^4$ is selected from the group consisting of H, alkyl, aryl, and alkaryl; k is an integer of from 1 through 4; m ranges from 0.1 through 6; n ranges from 0.1 through 6; p ranges from 1 through 99; q ranges from 0 through 99; r ranges from 0 through 99; and (q+r) ranges from 0.01 through 99. Additional ions may be present to balance the charges on Formula (1).

A treated pigment, comprises the complex of Formula (1), and a pigment selected from the group consisting of quinacridone, quinacridonequinone, phthalocyanine, anthraquinone, perylene, azo, azomethine, metal complex, benzimidazolone, perinone, diketopyrrolopyrrole, isoindoline, isoindolinone, iminoisoindoline, iminoisoindolinone, flavanthrone, dioxazine, indanthrone, anthrapyrimidine, quinophthalone, indigo, thioindigo, isoviolanthrone, pyranthrone, and carbon black.

A dispersion may comprise a pigment and complex of Formula (1).

An ink may comprise a pigment and the complex of Formula (1).

The aforementioned problems may be overcome to provide pigments that demonstrate superior properties in inks, especially in non-aqueous inkjet inks. This object may be achieved through the modification of the pigment surface with specially synthesized polymeric additives. These and other objects and advantages shall be made apparent from the accompanying description.

DETAILED DESCRIPTION

The complex of Formula (1) is represented by:

where, Q is an organic pigment moiety; D is $[R^1R^2N(CH_2CH(CH_3)O)_x(CH_2CH_2O)_yR^4]$; E is $[R^1R^2R^3N(CH_2CH(CH_3)O)_x(CH_2CH_2O)_yR^4]^+$; x and y independently range from 0 through 300, provided that for D and E selected independently, the sum of x+y is at least 3; M is selected from the group consisting of Al, Fe, Ca, Mg, Sr, Ba, Mn, Cu, Ni, Cd, Co, Zn, Cr, Ti, Zr, and $NR^1R^2R^3R^4$; $R^1$, $R^2$, and $R^3$ are independently selected from the group consisting of H, alkyl, aryl, alkaryl, poly-(oxyalkylene), provided that for E, if both $R^1$ and $R^2$ are H, then $R^3$ is H; $R^4$ is selected from the group consisting of H, alkyl, aryl, and alkaryl; k is an integer of from 1 through 4; m ranges from 0.1 through 6; n ranges from 0.1 through 6; p ranges from 1 through 99; q ranges from 0 through 99; r ranges from 0 through 99; and (q+r) ranges from 0.01 through 99. Additional ions may be present to balance the charges on Formula (1).

The ratio of the groups in Formula (1) may vary. The coefficient for the sulfonic acid groups, m, in Formula (1) may be in a range of 0.1-6; 1-6; 0.5-3; or 1-2. The coefficient for the metals and amine, n, in Formula (1) may be in a range of 0.1-6; 1-6; 0.5-3; or 1-2. The coefficient for the synergist, p, in Formula (1) may be in a range of 1-99, 1-50, 1-10, or 1-5. The coefficient for one amine, q, in Formula (1) may be in a range of 0-99, 0-50, 0-10, or 0-5. The coefficient for one amine, r, in Formula (1) may be in a range of 0-99, 0-50, 0-10, or 0-5. The coefficient for both amines, (q+r) may be in a range of 0.01-99, 1-99, 1-50, 1-10, 1-5 or 1-1.

Examples of an organic pigment moiety Q, are pigments such as quinacridone, quinacridonequinone, phthalocyanine, anthraquinone, perylene, azo, azomethine, benzimidazolone, perinone, diketopyrrolopyrrole, isoindoline, isoindolinone, iminoisoindoline, iminoisoindolinone, flavanthrone, dioxazine, indanthrone, anthrapyrimidine, quinophthalone, indigo, thioindigo, isoviolanthrone, pyranthrone, and the surface of the pigment particle of aforementioned pigments as well as carbon black pigments. An organic pigment moiety Q may be a mixture of pigments.

Other examples of an organic pigment moiety Q, are any known dye, especially direct, reactive, acid, vat, solvent, and disperse dyes. An organic pigment moiety Q may be a mixture of dyes, or a mixture of dyes and pigments.

A treated pigment comprises the complex of Formula (1), and a pigment selected from the group consisting of quinacridone, quinacridonequinone, phthalocyanine, anthraquinone, perylene, azo, azomethine, metal complex, benzimidazolone, perinone, diketopyrrolopyrrole, isoindoline, isoindolinone, iminoisoindoline, iminoisoindolinone, flavanthrone, dioxazine, indanthrone, anthrapyrimidine, quinophthalone, indigo, thioindigo, isoviolanthrone, pyranthrone, and carbon black.

A dispersion may comprise a pigment and complex of Formula (1).

An ink may comprise a pigment and complex of Formula (1).

A pigment may be treated with a complex of a sulfonated derivative of an organic pigment moiety in a form of insoluble metal or ammonium salt, and a polyetheramine. The complex may be prepared, for example, by sulfonation of the organic pigment moiety with sulfuric acid following by formation of an insoluble metal or ammonium salt and mixing with polyetheramine. The complex may also be prepared by forming an insoluble metal or ammonium salt of any sulfo-containing dyes following by combining with polyetheramine. Optionally, the complex may be made and isolated in the form of a press cake or dry color. The complex may be formed with sulfonic groups covalently bonded to the surface of the pigment particles. In this case, at least one complex is attached to the surface of one particle. The content of the complex in the treated pigment is 0.1-40%, or may be 5-15%.

The pigment may be treated with the complex at any stage of its manufacturing or application. The treated pigment is then mixed with components of inks and coatings, such as for non-aqueous ink-jet inks, optionally with other additives such as surfactants, polymeric dispersants and the like. This dispersion is then milled by conventional milling techniques known in the art. The final dispersion has attributes of low viscosity, excellent coloristic and stability properties. The dispersion may be used for the production of inks, such as non-aqueous ink-jet inks. It has been found that inks comprising the complex of Formula (1), demonstrate substantially improved filterability, rheological behavior, coloristic and stability properties.

The complex of Formula (1) is defined as a product of non-covalent interactions between the synergist of Formula (2) and a polyetheramine of Formula (3) or Formula (4), or both.

$$[Q[SO_3^-]_m M_n^{k+}]_p \qquad (2)$$

$$[R^1R^2N(CH_2CH(CH_3)O)_x(CH_2CH_2O)_y R^4] \qquad (3)$$

$$[R^1R^2R^3N(CH_2CH(CH_3)O)_x(CH_2CH_2O)_y R^4]^+ \qquad (4)$$

These interactions might include electrostatic, acid/base, and ionic interactions, hydrogen bonding, Van der Waals forces but not limited by them only.

The complex of Formula (1) may be produced in three steps:

1. Sulfonated Pigment Derivative (Synergist)/Introduction of Sulfonic Groups onto the Pigment Surface.

Techniques for sulfonation of organic pigments and for introduction of sulfonic groups onto the surface of organic pigments of different classes and carbon black are well known in the art. The sulfonation can be carried out for example, with sulfuric acid, fuming sulfuric acid, sulfur trioxide etc. Sulfonic groups can also be introduced through direct reaction with the pigment surface, for example by decomposition of diazonium salts of sulfanilic acid, or by chemical modification of intermediates that are used for synthesis of pigments. Typical examples can be found in (U.S. Pat. Nos. 3,386,843; 6,821,334; 5,837,045).

The ratio of the groups in Formula (2) may vary. The coefficient for the sulfonic acid groups, m, in Formula (2) may be in a range of 0.1-6; 1-6; 0.5-3; or 1-2. The coefficient for the metals and amine, n, in Formula (2) may be in a range of 0.1-6; 1-6; 0.5-3; or 1-2. The coefficient for the synergist, p, in Formula (2) may be in a range of 1-99, 1-50, 1-10, or 1-5.

2. Synthesis of a Synergist of Formula (2).

The synergist of Formula (2) may be produced by reacting the sulfonic acid groups with metal, or ammonium salts. Examples of metal and ammonium salts are: chlorides, fluorides, bromides, iodides, nitrates, and acetates. The reaction may be carried out in water, or in a mixture of water and solvent. Examples of appropriate solvents include alcohols, ketones, glycols, poly-glycols, and esters. The temperature and duration of the reaction is not particularly critical and it may be in a range of 20-95° C. for 5-200 min; or 40-60° C. for 30-60 min. Any type of mixing and homogenizing equipment may be used. However, high speed mixers operating at 1,000-12,000 rpm are typical. The resulting salt may be isolated by filtration and used in the form of a press cake or dry powder for the next step or used without isolation.

3. Synthesis of the Complex Represented by Formula (1).

The complex of Formula (1) may be made by mixing synergist (2) with polyetheramines (3), (4), or both. Synergist (2) may be blended with a polyetheramine in form of a press cake or slurry in water, in a mixture of water with solvents, or as a dry powder.

Applications of the Complex of Formula (1).

Complex of Formula (1) may be used at any stage of pigment production as well as in dispersions, inks, and coatings based on a treated pigment. Examples of use of the complex of Formula (1) are: making it "in situ;" blending it with pigment in the form of dry powders, press cakes, or slurries; and by adding it in the form of a dry powder to the pre-mix for the mill base of an ink or coating. The content of the complex of Formula (1) in the treated pigment is in the range of 0.1-40%, or it may be 5-15%. Examples of pigments that may be treated with the complex of Formula (1) may be any of following classes: quinacridones, quinacridonequinones, phthalocyanines, anthraquinones, perylenes, azo, metal complexes, azomethines, benzimidazolones, perinones, diketopyrrolopyrroles, isoindolines, isoindolinones, iminoisoindolines, iminoisoindolinones, flavanthrones, dioxazines, indanthrones, anthrapyrimidines, quinophthalones, indigo, thioindigo, isoviolanthrones, pyranthrone, and carbon black. Examples of the color index pigments of these classes are: quinacridones, such as PR122, PR202, PR207, PR209, PV19, and their solid solutions; phthalocyanines, such as PB15:1, PB15:2, PB15:3, PB15:4, PB15:6, PB16, PG7, PG36, and PG37; azo such as PY74, PY83; disazo, such as PY93, PY95, PY155, PY158, PY166, PR144, PR220, and PR221; metal complexes such as PY117, PY150, PY153; benzimidazolones such as PY120, PY151, PY154, PY156, PY175, PY180, PY181, PY194, PR171, PR175, PR176, PR185, PR208, PO36, PO60, PO62, PO64, PO72, PV32; diketopyrrolopyrroles such as, PR254, PR255, PR264, PR272, PO71, PO73; dioxazines such as PV23 and PV37; isoindolenones such as PY109, PY110, PY139, PY173, PY185, PO61, PO180; isoindolines such as PY139 and PY185; anthraquinones such as PY99, PY108, PY123, PY147, PY193, PR43, PR83, PR89, PR177 and PR196; indanthrones such as PB60 and PB64; flavanthrones, such as PY24; perylene such as PR123, PR178; PR179; PR190, PR224, PB31, and PB32; pyranthrone PR226; violanthrone PB65; and carbon black such as PB7.

Any type of mixing and homogenizing equipment may be used for premixing the components of a mill base. Mixing may be performed with high speed mixers operating at 1,000-12,000 rpm. The premix may then be milled using any type of known milling equipment to yield the dispersions, mill bases, final inks, or coatings. Examples of milling equipment include horizontal or vertical bead mill, basket mills, rotor/stator type machines, ball mills, attritors, and vibration mills. Any known type and size of media may be employed, for example, glass, ceramics, sand, polymeric, and metal media. The size of the media may have a range of 0.05-100 mm, or may be 0.1-2 mm. The concentrated pigment dispersion (mill base) may be made first from the treated pigment, or the untreated pigment and the complex of Formula (1) following by the admixing of all other needed components, to form the final ink or coating. The pigment content in mill base may be in the range of 10-50%, or 15-30%. The mean pigment particle size may be in the range of 8-500 nm, or 30-300 nm.

Examples of pigment dispersions for energy-curable inks, such as flexographic inks, offset inks, and inkjet ink; may contain the treated pigment, or optionally untreated pigment and the complex of Formula (1); combined with suitable monomers, oligomers, inhibitors for prevention of premature polymerization, and other synergists, dispersants, surfactants, and multipurpose additives. Examples of monomers are mono-, di-, or poly-functional acrylates, and co-polymers of acrylates with other known monomers. Other examples of monomers are di-acrylates, such as neopentylglycol diacrylates, tripropylene glycol diacrylates, or dipropylene glycol diacrylates. Examples of monofunctional monomers are cyclic trimethylolpropane formal acrylates, and lauryl acrylates. Examples of oligomers are amine modified acrylates, fatty acid modified acrylates, epoxy acrylates, epoxy methacrylates, polyester acrylates, and urethane methacrylates. Examples of inhibitors are ETHANOX (Albemarle) and GENORAD (Rahn).

Pigment dispersions for solvent-based inks, including solvent ink-jet inks, and coatings may contain treated pigment, or a combination of untreated pigment and the complex of Formula (1) combined with solvents, resins, other pigments, dyes, extenders, synergists, dispersants, surfactants, and multipurpose additives.

Examples of solvents are ketones, acetates, glycol ethers, glycol ether acetates, lactates, alcohols, esters, aromatic, aliphatic, alicyclic and heterocyclic hydrocarbons, silicones, and any combinations thereof. Examples of resins are vinyl, acrylic, styrene acrylic, epoxy, alkyd, polyurethane, polyesters, polyamides, and any co-polymers or mixtures of them.

Examples of dispersants and other synergists include SOLSPERSE (Noveon), EFKA (Ciba), BYK (BYK-Chemie), and TEGOSPERSE (Degussa).

The resultant inks and coating have attributes of low viscosity, excellent coloristic and stability properties. The inks may also demonstrate excellent filterability and they are exceptionally stable under accelerated aging conditions.

The following examples further illustrate details for overcoming the described problems and are not intended to limit the spirit and the scope of the claims. Unless otherwise indicated, % and parts always denote % and parts by weight.

Test Procedures.

The viscosity of the inks is measured with a Brookfield Viscometer LVDV-II+Pro at T=50° C., 100 RPM, and spindle number 18. The viscosity of the pigment dispersion is determined with Brookfield Viscometer LVDV-II at 12, 30, and 60 RPM, and T=25° C.; and spindle numbers 1, 2, 3, and 4. The particle size distribution is determined using Nanotrac 250. Filterability of ink-jet ink is defined as the time in seconds needed to filter 150 g of ink through a filter with a diameter of 47 mm, pore size about 3 μm, and with a vacuum of 20 mm Hg. The accelerated aging test is performed by placing a sample of the ink in a closed, non-transparent container for four weeks at 50° C. The ink is considered a stable one if there is no statistically significant difference between parameters of the initial and aged samples.

EXAMPLE 1

265.6 parts of press cake of PR122 (Sun Chemical) with solids content 32.0% and 34.1 parts of press cake of aluminum salt of quinacridone monosulfonic acid (QSA-Al) with solids content 20.5% were charged into a beaker along with 1 L of water. The slurry was homogenized for 30 min at 5,000 RPM using high speed mixer with a Cowles blade at room temperature. Eight parts of Surfonamine B-100 (Huntsman), and 50 g of 96% sulfuric acid were added to the pigment slurry and agitated for one hour. The resulting pigment was isolated by filtration, washed with water until the filtrate had a pH of 7-8, dried at 80° C., and ground into a dry pigment. A pigment dispersion for energy-curable inks was made as follows: 46 parts of the described pigment complex, 131.6 parts of Sartomer SR9003B, 0.4 parts of Ethanox 703, and 22 parts of Solsperse 39000 were homogenized for 15 min at 3000 RPM at room temperature. The pre-mix was then milled in an Eiger mill for one hour with 0.8 mm ceramic media. The resulting dispersion was fluid and stable under normal storage conditions. 21 parts of the dispersion was mixed with 129 parts of Sartomer SR9003B to form a final ink. The initial viscosity of the ink was 8.49 cPs, surface tension —24.6 Din/cm, average particle size—170 nm with no particles larger than 1 μm. The filterability of the ink was 52 sec. The parameters of the ink did not change significantly after the accelerated aging test. The color strength versus ink of Comparative Example 1 was 118.5%

COMPARATIVE EXAMPLE 1

The dispersion and the ink were made as Example 1, but commercially available PR122 was used in place of the treated pigment. The resulting dispersion lost flow ability 20 min after it was produced. The initial viscosity of ink was outside the working range of the viscometer, 30 cPs. The ink gelled after the accelerated aging test.

COMPARATIVE EXAMPLE 2

The dispersion and the ink were made as in Example 1, but Surfonamine B-100 was excluded from the composition. The filterability of the ink was in excess of 600 sec. The color strength versus ink of Comparative Example 1 was 105.6%. The other properties of the ink were similar to those of Example 1.

EXAMPLE 2

The dispersion and the ink were made as in Example 1, but Solsperse 39000 was replaced by the same amount of Solsperse 32000. Properties of both the dispersion and the ink were similar to those of Example 1.

EXAMPLE 3

552.6 parts of press cake of aluminum salt of sulfonated PV19 with solids content 19.8% was charged into a beaker along with 2 L of water. The slurry was homogenized for 30 min at 60-70° C. and 5,000 RPM using a high speed mixer with a Cowles blade. 90.8 parts of Surfonamine B-100 was then added, and the slurry was stirred for 60 minutes under the same conditions. The complex was isolated by filtration, washed to a pH of 7-8, and dried at 80° C. to a constant weight. The yield of Formula (1) (Q=quinacridone, M=Al, D=Surfonamine B-100, m=1, r=0, k=3) was 99.8%.

EXAMPLE 4

39.1 parts of PR122 (Sun Chemical); 6.9 parts of the complex from Example 3; 131.6 parts of Sartomer SR9003B; 0.4 parts of Ethanox 703; and 22 parts of Solsperse 32000 were homogenized for 15 min at 3000 RPM at room temperature. The pre-mix was milled then in an Eiger mill for one hour with 0.8 mm ceramic media. The resulting dispersion was fluid and stable under normal storage conditions. 21 parts of the dispersion was mixed with 129 parts of Sartomer SR9003B to form a final ink. Initial viscosity of the ink was 6.51 cPs, surface tension –24.9 Din/cm, average particle size-159 nm with no particles larger than 1 μm. The filterability of the ink was 38 sec. The parameters of the ink did not change significantly after the accelerated aging test. The color strength versus the ink of Comparative Example 1 was 116.0%.

EXAMPLE 5

The dispersion and the ink were made as in Example 1, but PR122 was replaced by PV19 (Sun Chemical). The parameters of the ink were similar to those of Example 1.

EXAMPLE 6

14.40 parts of treated Red 122 pigment from Example 1, 38.3 parts of EB Acetate Solvent, 25.9 parts of hexyl acetate solvent, 14.40 parts of VROH resin (Dow Chemical), and 7.0 parts of Solsperse 32000 (Noveon), were mixed for 15 minutes at 3000 RPM at room temperature. The premix was milled in an Eiger mill for three hours with 0.8 mm ceramic media. The resulting dispersion had a viscosity of 408 cps. An ink jet ink was made from the dispersion, vinyl resin, and additional EB Acetate solvent. The resulting ink had a viscosity of 11-13 cps, and the viscosity was stable after oven-aging. The ink had acceptable filter-ability.

EXAMPLE 7

485.5 parts of press cake of aluminum salt of monosulfonated PY12 with solids content 20.64%, were charged into a beaker along with 3 L of water. The slurry was homogenized for 30 min at 60-70° C. at 5,000 RPM using a high speed mixer with a Cowles blade. 50.0 parts of Surfonamine B-100 was then added, and the slurry was stirred for 60 minutes under the same conditions. The additive was isolated by filtration, washed to a pH of 7-8, and dried at 80° C. to a constant weight. The yield of Formula (1) (Q=PY12, M=Al, D=Surfonamine B-100, m=1, r=0, k=3) was 99.2%.

EXAMPLE 8

The dispersion and the ink were made as in Example 4, but PR122 was replaced by PY74 available from (Sun Chemical), and the complex of formula (1) from Example 3 was replaced by the complex from Example 7. The parameters of the ink were similar to those of Example 1.

What is claimed is:

1. A complex represented by Formula (1):

$$[Q[SO_3^-]_m M_n^{k+}]_p D_q E_r \qquad (1)$$

wherein:
Q is an organic pigment moiety;
D is independently $[R^1R^2N(CH_2CH(CH_3)O)_x(CH_2CH_2O)_y R^4]$;
E is independently $[R^1R^2R^3N(CH_2CH(CH_3)O)_x(CH_2CH_2O)_y R^4]^+$;
x and y independently range from 0 through 300, provided that for D and E selected independently, the sum of x+y is at least 3;
M is independently selected from the group consisting of Al, Fe, Ca, Mg, Sr, Ba, Mn, Cu, Ni, Cd, Co, Zn, Cr, Ti, and Zr;
$R^1$, $R^2$, and $R^3$ are independently selected from the group consisting of H, alkyl, aryl, alkaryl, poly-(oxyalkylene), provided that for E, if both $R^1$ and $R^2$ are H, then $R^3$ is H;
$R^4$ is independently selected from the group consisting of H, alkyl, aryl, and alkaryl;
k is an integer of from 1 through 4;
m ranges from 0.1 through 6;
n ranges from 0.1 through 6;
p ranges from 1 through 99;
q ranges from 0 through 99;
r ranges from 0 through 99; and
(q+r) ranges from 0.01 through 99.

2. The complex of claim 1, wherein Q is selected from the group consisting of quinacridone, quinacridonequinone, phthalocyanine, anthraquinone, perylene, azo, azomethine, benzimidazolone, perinone, diketopyrrolopyrrole, isoindoline, isoindolinone, iminoisoindoline, iminoisoindolinone, flavanthrone, dioxazine, indanthrone, anthrapyrimidine, quinophthalone, indigo, thioindigo, isoviolanthrone, pyranthrone, a carbon black pigment, and a dye.

3. The composition of claim 1, wherein Q is selected from the group consisting of quinacridone, azo, phthalocyanine, benzimidazolone, diketopyrrolopyrrole, dioxazine, and perylene.

4. The complex of claim 1, wherein Q is quinacridone.

5. The complex of claim 1, wherein M is selected from the group consisting of Al, Fe, Ca, and Mg.

6. The complex of claim 1, wherein M is Al.

7. The complex of claim 1, wherein $R^1$, $R^2$, and $R^3$ are H.

8. The complex of claim 1, wherein m is 1.

9. The complex of claim 1, wherein r is 0.

10. The complex of claim 9, wherein p/q ranges from 0.1 through 10.

11. The complex of claim 1, wherein x and y independently range from 1 through 60.

12. A treated pigment, comprising the complex of claim 1, and a pigment selected from the group consisting of quinacridone, quinacridonequinone, phthalocyanine, anthraquinone, perylene, azo, azomethine, benzimidazolone, perinone, diketopyrrolopyrrole, isoindoline, isoindolinone, iminoisoindoline, metal complex, iminoisoindolinone, flavanthrone, dioxazine, indanthrone, anthrapyrimidine, quinophthalone, indigo, thioindigo, isoviolanthrone, pyranthrone, and carbon black.

13. The treated pigment of claim 12, wherein the pigment is selected from the group consisting of quinacridone, phthalocyanine, azo, metal complex, dioxazine, diketopyrrolopyrrole, and carbon black.

14. The treated pigment of claim 13, wherein the pigment is quinacridone.

15. The treated pigment of claim 12, wherein the complex comprises about 0.5 to about 40% of the pigment.

16. The treated pigment of claim 12, wherein the complex comprises about 5 to about 15% of the pigment.

17. The treated pigment of claim 12, wherein Q of the complex is selected from the group consisting of quinacridone, phthalocyanine, azo, benzimidazolone, diketopyrrolopyrrole, dioxazine, and perylene.

18. The treated pigment of claim 12, wherein the mean pigment particle size is in the range of about 10 to about 500 nm.

19. The treated pigment of claim 12, wherein the mean pigment particle size is in the range of about 40 about 300 nm.

20. A dispersion, comprising an pigment and the complex of claim 1.

21. An ink, comprising a pigment and complex of claim 1.

22. An ink of claim 21, useful for ink-jet, flexographic, screen, or offset applications.

* * * * *

UNITED STATES PATENT AND TRADEMARK OFFICE
CERTIFICATE OF CORRECTION

PATENT NO. : 7,901,503 B2
APPLICATION NO. : 12/597045
DATED : March 8, 2011
INVENTOR(S) : Stanislav Vilner et al.

It is certified that error appears in the above-identified patent and that said Letters Patent is hereby corrected as shown below:

Title Page from:

(75) Inventor<u>s</u>: Stanislav Vilner, Mason OH (US)

to:

--(75) Inventors: Stanislav Vilner, Mason OH (US); Darren Ortalano, Cincinnati (US)--

Signed and Sealed this
Thirty-first Day of May, 2011

David J. Kappos
*Director of the United States Patent and Trademark Office*